Sept. 1, 1931.  G. L. R. J. MESSIER  1,821,719
BRAKE CONTROLLING DEVICE
Filed Aug. 2, 1929  3 Sheets-Sheet 1
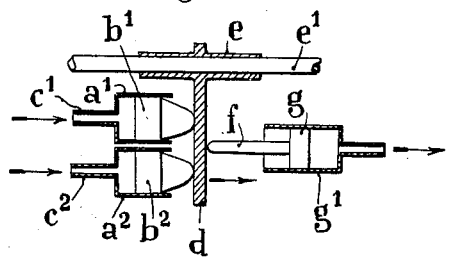
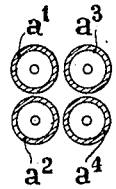
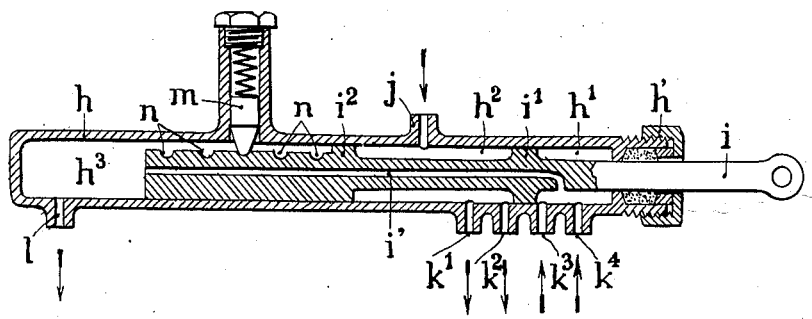
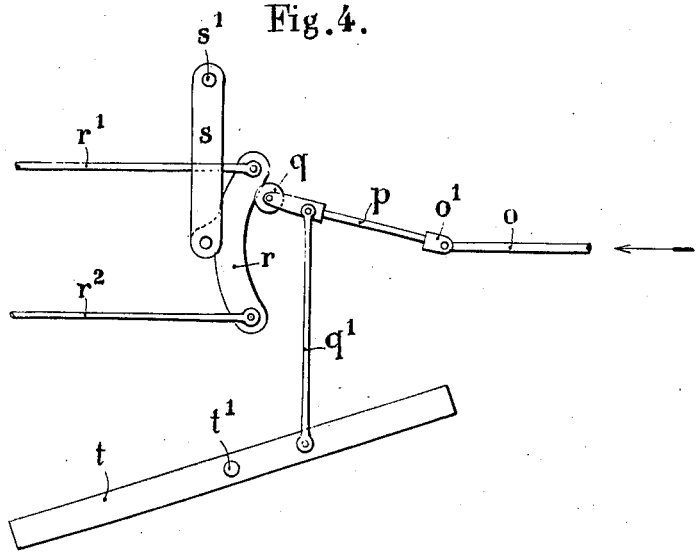

Sept. 1, 1931.  G. L. R. J. MESSIER  1,821,719
BRAKE CONTROLLING DEVICE
Filed Aug. 2, 1929  3 Sheets-Sheet 3

Patented Sept. 1, 1931

1,821,719

UNITED STATES PATENT OFFICE

GEORGE LOUIS RENÉ JEAN MESSIER, OF MONTROUGE, FRANCE

BRAKE CONTROLLING DEVICE

Application filed August 2, 1929, Serial No. 382,868, and in France August 10, 1928.

The present invention relates to brake controlling device capable of receiving various applications but more particularly intended for the control of the brakes of the two wheels of an airplane.

The invention has for its object:

1. To allow the pilot of an airplane without having himself exert any effort, of regulating the intensity of the braking action, or the proportion between said intensity and a definite factor, for instance the pressure of the tail skid on the ground.

2. To allow the pilot of varying the intensity of the braking of a wheel relatively to the other so as to facilitate the steering on the ground.

The principle of the invention consists in utilizing a number of cylinders within each of which can move a piston, each piston co-operating, when it is pushed by a fluid under pressure introduced in the cylinder, to the application of the brakes, and these cylinders being combined with means allowing to put in action any number of them, at will.

It will therefore be understood that, for a definite pressure of the fluid, the intensity of braking is proportional to the number of cylinders put in action.

This putting in action of the desired number of cylinders is obtained by means of a control device actuated by the pilot and by means of which a fluid under pressure can be sent into the cylinders which are to act, whilst the fluid in the other cylinders is caused to flow in the atmosphere.

For allowing the braking of the two wheels in a different manner, the invention comprises a special device by means of which the total action of the braking is divided into two stresses, the ratio of which can be regulated at will, these two stresses being subsequently transmitted to each of the wheels.

The invention is diagrammatically illustrated, but by way of example only, in the accompanying drawings in which.

Figure 1:
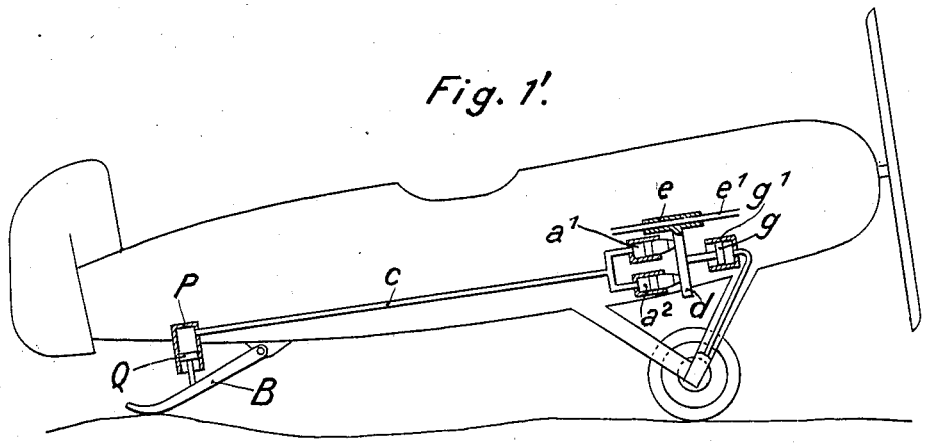
Figure 2:
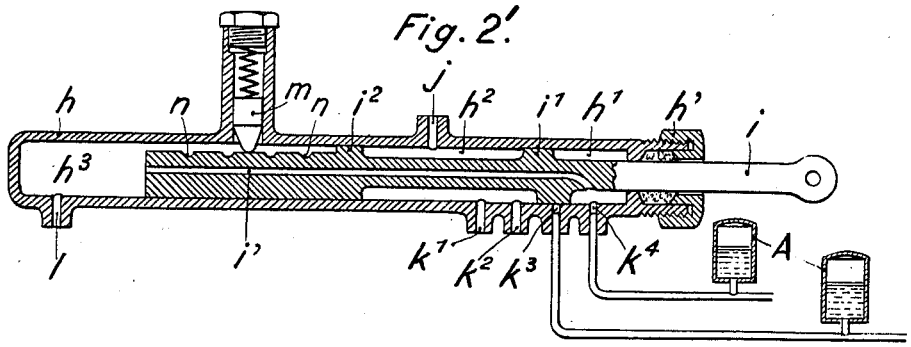
Figure 3:
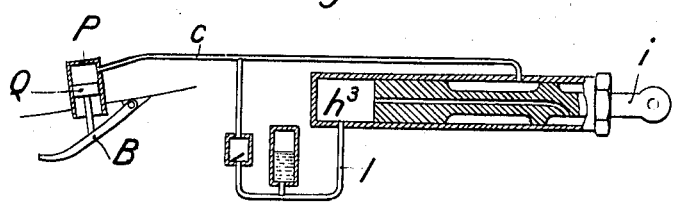
Figure 5:
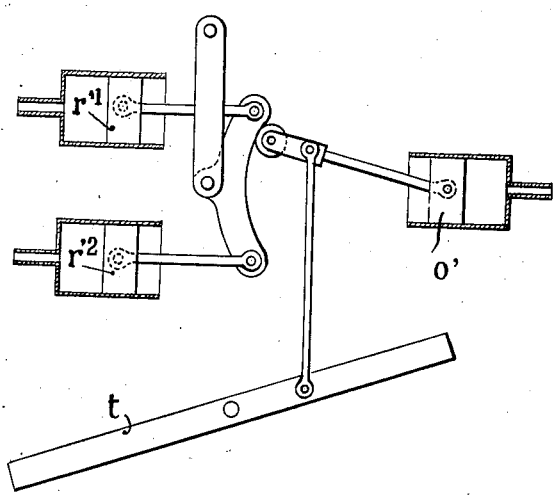
Figure 6:
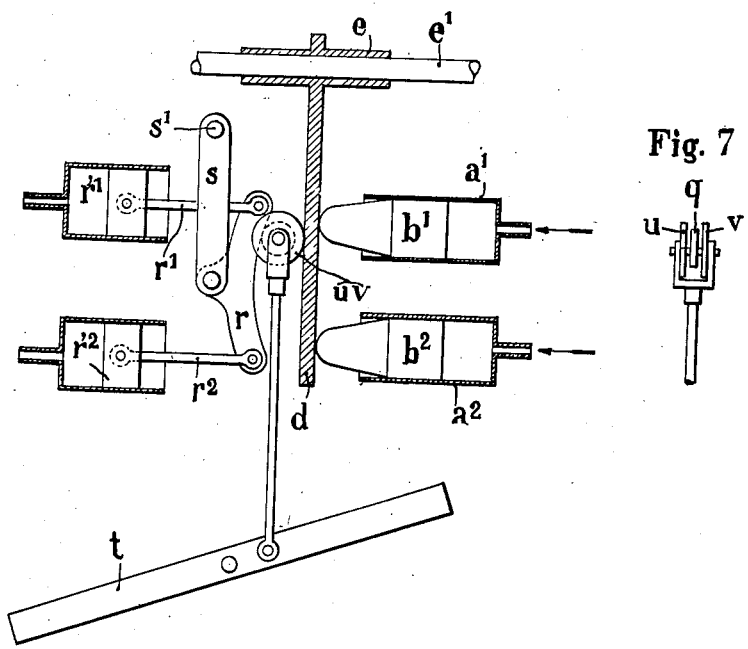
Figure 7:
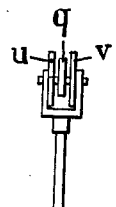

Fig. 1 is a section of the regulating system.
Fig. 2 is a corresponding side view.
Fig. 3 is a section of the controller.
Fig. 4 shows the device distributing the braking stresses.
Fig. 5 is a modification.
Fig. 6 is a view of the entire system showing the combination of the regulator and of the device distributing the braking stresses.
Fig. 7 is a corresponding partial side view.
Fig. 1' shows the device made according to the invention as adapted to an aeroplane.
Fig. 2' is a modification of Fig. 3 and
Fig. 3' shows another modification.

The principle of the invention is illustrated in Fig. 1. A number of cylinders $a^1$, $a^2$ ... etc. (four in the example of Fig. 2) are arranged parallel to each other and secured to the casing of the apparatus (not shown).

Pistons, such as $b^1$, $b^2$ ... etc., can move within the cylinders under the action of a fluid under pressure which can be fed by conduits $c^1$, $c^2$.

The various pistons bear against a common plate $d$, guided for instance by a socket $e$ rigid with the said plate and slidable on a rod $e^1$ rigid with the casing of the apparatus.

The plate $d$ bears in its turn on a rod $f$ controlling in any manner whatever the application of the brake, for instance by pressing on the piston $g$ of the transmitting cylinder $g^1$ of a hydraulic control.

The liquid is sent into the cylinders $a^1$, $a^2$ ... at the pilot's will, who can put any number of these cylinders in communication with a source of supply of fluid under pressure.

This source of supply can be a pump barrel P (Fig. 1'), the piston L of which is actuated by the pressure of the tail skid on the ground, so as to avoid the risks of turning over.

A form of construction of the controller actuated by the pilot is illustrated in Fig. 3. A cylindrical body $h$ is closed at one of its ends by a stuffing-box $h'$, in which can pass a rod $i$ carrying two pistons $i^1$, $i^2$ provided with packings.

These pistons divide the cylinder $h$ in three compartments $h^1$, $h^2$, $h^3$; a conduit $j$ leads the fluid under pressure into the compartment $h^2$.

Orifices $k^1$, $k^2$, $k^3$, $k^4$ are connected to the four cylinders $a^1$, $a^2$, $a^3$, $a^4$ of Figs. 1 and 2.

The compartment $h^1$ communicates through an axial channel $i'$ with the compartment $h^3$, from which extends a conduit $l$ leading to an exhaust point.

The rod $i$ can be axially moved by means of any control actuated by the pilot.

It will be seen that in the position shown in Fig. 3, the orifices $k^1$ and $k^2$ are in communication with the source of supply of fluid under pressure, whilst the orifices $k^3$ and $k^4$ are in communication with the exhaust.

A spring stop member $m$ enters notches $n$ and ensures the stoppage of the rod $i$ exactly in each of the five positions it must take for putting the required number of cylinders in communication with the admission, and the others with the exhaust.

Small air bells A can be arranged over each of the orifices $k^1$, $k^2$, $k^3$, $k^4$ so as to avoid that the incompressibility of the liquid should block up the system if the piston $i^1$ was left in an intermediate position which would obturate one of these orifices.

If the source of supply of fluid under pressure is a pump controlled by the tail skid, the exhaust conduit $l$ can be connected to a vessel partly filled with liquid and partly with gas compressed under a low pressure, so as to allow by means of a conduit and of a valve the return of the liquid, upon flying off, into the tail skid pump.

For allowing the pilot to exert a stronger braking action on one wheel than on the other, it is possible to provide, two systems such as that shown in Fig. 1, and two controllers such as that illustrated in Fig. 3.

It is more practical to make use, for this differential braking, of a special device diagrammatically shown in Fig. 4.

In this device, a rod $o$, which is actuated by the single braking control, the rod $f$ of Fig. 1 for instance, is connected by a joint $o^1$ and a link $p$ to a roller $v$ movable along a beam $r$, the ends of which are connected to two rods $r^1$, $r^2$.

The middle of the beam is connected by a link $s$ to a fixed axis $s^1$ so as to allow it to be shifted following a line substantially parallel to the direction of the rods $o$, $r^1$, $r^2$.

The displacement of the roller $q$ along the beam is controlled by a transmission $q^1$ attached to a suitable point of a rudder bar $t$, movable about an axis $t^1$ and controlling the rudder.

The transmission $q^1$ is devised in such a manner that, when the rudder bar $t$ is in position for flying in a straight line, the roller $q$ is located at the middle of the beam $r$.

In this position, any thrust stress upon the rod $o$ is transmitted by half on the rods $r^1$, $r^2$, these latter each controlling the braking of one of the wheels; the braking is at this moment equal on each wheel.

The controls $r^1$ and $r^2$ are devised in such a manner that any movement of the rudder bar which would have for effect, during flight, to cause a turn to the right for instance, causes on the ground a more intense braking of the left-hand wheel by displacement of the roller $q$ and by consequent variation of the leverages.

In the form of construction illustrated in Fig. 5, the rods $o$, $r^1$, $r^2$ of Fig. 4 are replaced by the pistons $o'$, $r'^1$, $r'^2$ of three hydraulic transmissions.

Finally, Figs. 6 and 7 illustrate a combination of the devices of Figs. 1, 4 and 5. The cylinders $a^1$, $a^2$ . . . (two of which only are shown) can receive fluid under pressure and the pistons $b^1$, $b^2$ . . . press against a plate $d$ mounted in the same manner as in Fig. 1.

Two rollers $u$ and $v$ (Fig. 7) can roll on the plate $d$, whilst a third smaller roller $q$, mounted on the same axis, rolls on the beam $r$ rendered rigid with the pistons $r'^1$ and $r'^2$ through the medium of the links $r^1$ and $r^2$.

The displacement of the rollers is controlled by the rudder bar in the same manner as in Fig. 4.

The above described arrangements are given by way of example only, all the details of construction and execution the forms, materials and dimensions can be varied without departing thereby from the principle of the invention.

Claims:—

1. Brake controlling device, more particularly intended for braking the wheels of airplanes, comprising a compressed fluid supply, a plurality of controlling cylinders in which said fluid under pressure may be admitted, a plurality of pistons working in said cylinders and acting on a common operating member, a multiple ways valve controlling the admission of said fluid under pressure into a chosen number of said cylinders and braking means actuated by said operating member.

2. Brake controlling device, more particularly intended for braking the wheels of airplanes, comprising a compressed fluid supply, a plurality of controlling cylinders in which said fluid under pressure may be admitted, a plurality of pistons working in said cylinders and acting on a common operating member, a controlling slide-valve by means of which the fluid under pressure is sent in the required number of active cylinders, means to put the idle cylinders in communication with the exhaust pipe and braking means actuated by said operating member.

3. Brake controlling device, more particularly intended for braking the wheels of airplanes, comprising a compressed fluid supply, a plurality of controlling cylinders in which said fluid under pressure may be admitted, a plurality of pistons working in said cylinders and acting on a common operating member, a controlling slide-valve by means of which the fluid under pressure is sent in the required number of active cylinders, means to put the idle cylinders in communication with the exhaust pipe and braking means actuated by said operating member, through the intermediary of a compensating device for distributing the braking action between the wheels according to a ratio which varies with the movements of the rudder bar of the airplane.

4. Brake controlling device, more particularly intended for braking the wheels of airplanes, comprising a compressed fluid supply, a plurality of controlling cylinders in which said fluid under pressure may be admitted, a plurality of pistons working in said cylinders and acting on a common operating member, a controlling slide-valve by means of which the fluid under pressure is sent in the required number of active cylinders, means to put the idle cylinders in communication with the exhaust pipe and braking means actuated by said operating member, through the intermediary of a compensating device for distributing the braking action between the wheels according to a ratio which varies with the movements of the rudder bar of the airplane, said compensating device comprising a beam each end of which is mechanically connected to the brakes of one of the wheels of the airplane and a roller movable along said beam whilst the total braking stress is exerted at a variable point which transmits the braking action to said beam and which is mechanically connected to said rudder bar.

The foregoing specification of my brake regulating system; signed by me this 19th day of July, 1929.

GEORGE LOUIS RENÉ JEAN MESSIER.